Dec. 27, 1960 W. M. RAUSCHER 2,966,259
CAMELBACK ROLL
Filed Feb. 25, 1959

INVENTOR
WALTER M. RAUSCHER
BY McCoy, Greene &
Te Grotenhuis
ATTORNEYS

United States Patent Office 2,966,259
Patented Dec. 27, 1960

2,966,259

CAMELBACK ROLL

Walter Martin Rauscher, Akron, Ohio, assignor to The General Tire & Rubber Company, Akron, Ohio, a corporation of Ohio Filed Feb. 25, 1959, Ser. No. 795,380

4 Claims. (Cl. 206—59)

This invention relates to devices employed for shipping and storing strips of uncured rubber stock that have been extruded to the proper cross sectional form and cut to length for use in retreading pneumatic tire casings, the stock so prepared being known in the trade as "camelback."

The invention relates particularly to a package in the form of a roll for a single camelback strip, the roll being provided with a tubular core that is of a size and shape to permit a strip of camelback to be wound in a plurality of convolutions thereon, the core being formed of a single strip of resilient sheet metal that is held in tubular form by interlocking end portions of the strip, the strip being sufficiently resilient to permit it to be flattened when its ends are detached from one another so that the core forming strips may be stacked for shipment to the rubber factory after the camelback has been used.

Retreading of pneumatic tires is performed in thousands of tire repair shops scattered throughout the country that are provided with retread vulcanizing equipment but not with means for compounding and extruding raw rubber. It is therefore necessary for such retreading shops to obtain the camelback from one of the relatively few rubber factories equipped to compound, extrude and cut to length uncured tread stock suitable for retreading tires of the various sizes that are in use on motor vehicles. For the convenience of the retreader the individual camelback strips are separately packaged and labeled. It is quite essential that the soft uncured camelback be so packaged that it holds its cross sectional shape and may be applied to the tire casing without substantial stretching or other deformation. A convenient way of packaging the individual camelback strips is to wind the strip in a plurality of convolutions around a suitable core. The core should have a smooth surface composed of a material such as a metal or a plastic to which the tacky camelback will not strongly adhere, adhesion between successive layers of camelback in the roll being prevented by means of a liner strip applied to one face of the camelback strip.

Cores suitable for the camelback strips are relatively expensive and too bulky for economical reshipment to the rubber factory. Consequently, the packaging of the camelback adds materially to the cost of retreading tires. The present invention provides a camelback roll with a knocked down sheet metal core formed of a transversely flat resilient strip of sheet metal and having its ends connected by a detachable joint so that after the camelback is removed the ends of the sheet metal strip may be disconnected and the strip laid flat for stacking with other similar knocked down cores for shipment back to the rubber factory, thereby effecting a substantial saving in the cost of shipping and storing camelback which is a substantial item in the cost of retreading tires.

Reference should be had to the accompanying drawings forming a part of this specification in which.

Figure 1:
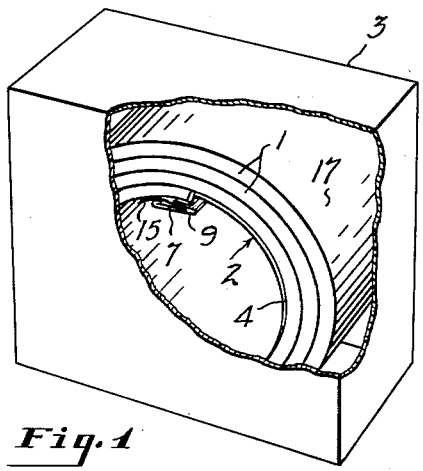
Figure 1 is a perspective view showing a camelback roll embodying the invention in a shipping carton.
Figure 2:
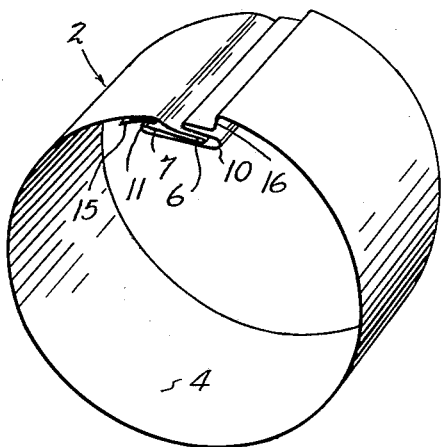
Fig. 2 is a perspective view of the knockdown tubular sheet metal core.
Figure 5:
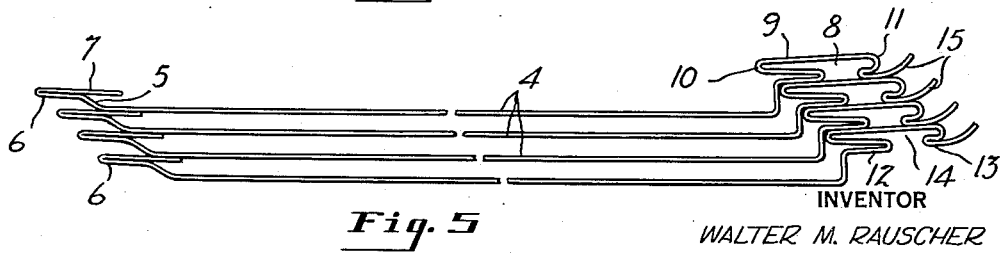
Fig. 5 is an end view of a stack of core forming strips.

As shown in Fig. 1 of the drawings, a camelback strip 1 is wound in a plurality of convolutions around a tubular core 2 and the roll so formed is placed for shipment in a suitable shipping carton 3. As shown in Figs. 2 and 5 of the drawings, the tubular core 2 is formed of a single transversely flat resilient sheet metal strip. The strip has a body portion 4 which will, due to its resiliency, assume the approximately cylindrical form shown in Fig. 2 when the ends of the strip are secured together. When the ends of the strip are disconnected the resiliency of the metal will tend to straighten the body of the strip so that the strips may be readily stacked as shown in Fig. 5.

Figure 3:
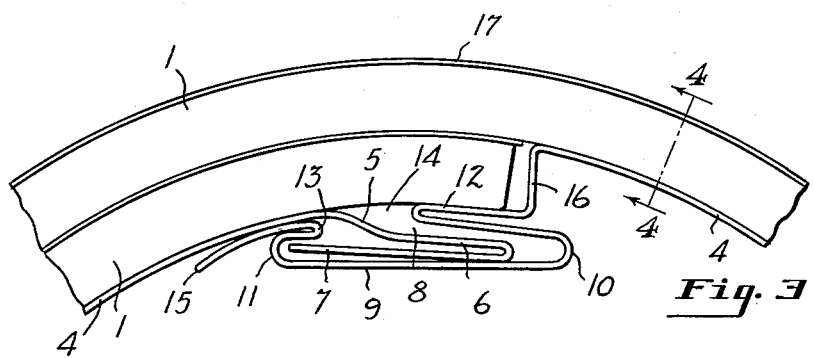
Fig. 3 is a fragmentary end elevation showing the detachable joint connecting the ends of the sheet metal core strip and holding the core in its tubular form and also showing the manner in which the camelback is wound on the roll.
Figure 4:
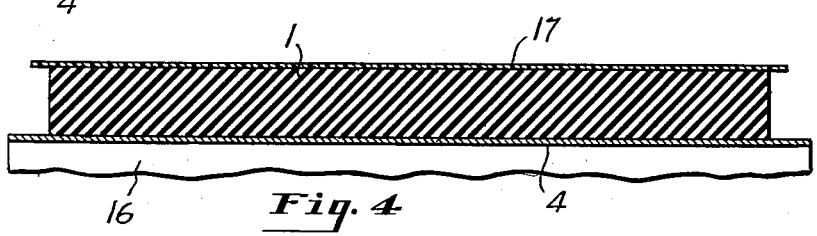
Fig. 4 is a section taken on the line indicated at 4—4 in Fig. 3.

As best shown in Fig. 3, one end of the core strip is provided with an inwardly bent portion 5 and an end portion 6 of double thickness formed by bending the strip back upon itself, the bent back portion being of a length to provide a reversely extending flange 7 that projects beyond the inturned portion 5 to provide a retaining flange. The opposite end of the core strip is bent along parallel transverse lines to provide an inwardly projecting channel 8 extending transversely across the strip that is provided with reentrant inner and outer side walls 10 and 11 that provide oppositely disposed retaining flanges 12 and 13 of double thickness that are spaced outwardly from the bottom 9 of the channel. The flanges 12 and 13 project one toward the other and provide between them a restricted opening 14 to the channel 8 through which the inwardly offset portions 6 and 7 of the opposite end of the strip may be inserted into the channel 8. In connecting the ends of the strip together the double end 6 is inserted beneath the retaining flange 12 and is moved into the reentrant portion 10 of the channel far enough to permit the retaining flange 7 to pass the inner end of the retaining flange 13, after which the resiliency of the strip will cause the retaining flange 7 to be drawn into the reentrant portion 11 of the channel beneath the retaining flange 13 to lock the ends together. The core strip is bent to provide a positioning shoulder 16 adjacent the detachable joint connecting the ends of the strip, the shoulder 16 being radially disposed and of a radial height substantially equal to the thickness of the camelback strip 1.

One side face of the camelback strip 1 is covered with a liner 17 of suitably treated plastic or cloth to prevent adhesion between superposed layers of the camelback in the roll. The camelback strip is wound upon the core as shown in Fig. 3 with one of its ends closely adjacent the shoulder 16 and overlying the detachable joint connecting the ends of the core strip with its uncovered face engaging the core throughout the inner convolution of the camelback strip and the remainder of the uncovered side of the camelback engaging the liner strips 17.

While the camelback is in place on the core the interlocking ends of the core strip are securely held against separation but when the camelback strip is removed from the core the end 6 may be easily moved into the reentrant portion 10 of the channel far enough to free the retaining flange 7 from the flange 13 and permit detachment of the end strip.

It is to be understood that in accordance with the provisions of the patent statutes, variations and modifications of the specific devices herein shown and described may be made without departing from the spirit of the invention.

What I claim is:

1. A camelback roll comprising a knockdown tubular core formed of a single transversely flat, flexible and resilient sheet metal strip that has one end portion bent along parallel transverse lines to form an inwardly projecting outwardly opening channel shaped locking portion that has a reentrant wall on the side thereof nearest the end of the strip that is formed to provide a retaining flange overlying and spaced from the bottom of the channel, the opposite end portion of the strip being bent to form an inwardly projecting locking portion that is received in said channel, that has a reversely extending flange that is received beneath said retaining flange and that is of a width to permit it to be moved in said channel to free said reversely extending flange from said retaining flange so as to provide a detachable connection between the ends of the strip which retains the strip in tubular form, said strip being bent at a point spaced circumferentially a short distance from one of its locking portions to provide a substantially radial shoulder adjacent, parallel to and projecting outwardly with respect to said connection, and a strip of camelback of a thickness substantially the same as the height of said shoulder having one end portion overlying said joint, engaging opposite end portions of said metal strip at opposite sides of said channel, terminating adjacent said shoulder and wound in a plurality of convolutions around said core.

2. A camelback roll according to claim 1 in which the camelback strip has one of its tacky side faces covered with a liner and in which said camelback strip is wound on the roll with the uncovered face of its first convolution in engagement with said core.

3. A knockdown core for a camelback roll comprising a single transversely flat, flexible and resilient sheet metal strip that has one end portion bent along parallel transverse lines to form an inwardly projecting outwardly opening channel shaped locking portion that has a reentrant wall on the side thereof nearest the end of the strip that is formed to provide a retaining flange overlying and spaced from the bottom of the channel, the opposite end portion of the strip being bent to form an inwardly projecting locking portion that is received in said channel, that has a reversely extending flange that is received beneath said retaining flange and that is of a width to permit it to be moved in said channel to free said reversely extending flange from said retaining flange so as to provide a detachable connection between the ends of the strip which retains the strip in tubular form, said strip being bent at a point spaced circumferentially a short distance from one of its locking portions to provide a substantially radial shoulder, adjacent, parallel to and projecting outwardly with respect to said connection.

4. A knockdown core for a camelback roll comprising a single transversely flat, flexible and resilient sheet metal strip that has one end portion bent along parallel lines to form an inwardly projecting outwardly opening channel-shaped locking portion that has reentrant side walls that provide oppositely disposed retaining flanges overlying and spaced from the bottom of the channel, the opposite end portion of said strip being bent to form an inwardly projecting locking portion that is received in said channel and that is bent back upon itself to provide a reversely extending flange that is received beneath the retaining flange at the side of the channel nearest the end of the strip adjacent which the channel is formed and an end portion that is received beneath the other retaining flange, said channel having an opening of less width than said locking portion and being of greater width inwardly of the opening to permit movement of said reversely extending flange into and out of the space beneath its retaining flange to provide a detachable connection for holding the strip in tubular form, said strip being bent at a point spaced circumferentially a short distance from said channel-shaped locking portion to provide a substantially radial positioning shoulder adjacent, parallel to and projecting outwardly with respect to said connection.

References Cited in the file of this patent

UNITED STATES PATENTS

| | | |
|---|---|---|
| 1,356,234 | Streijffert | Oct. 19, 1920 |
| 1,444,061 | Butler | Feb. 6, 1923 |
| 1,886,881 | Hayman | Nov. 8, 1932 |
| 1,900,749 | Sladky | Mar. 7, 1933 |